US012646180B2

(12) United States Patent
Huang

(10) Patent No.: US 12,646,180 B2
(45) Date of Patent: Jun. 2, 2026

(54) METHOD AND APPARATUS FOR CAPTURING MOTION TRAJECTORY OF TO-BE-RENDERED VIRTUAL OBJECT AND ELECTRONIC DEVICE

(71) Applicant: TENCENT TECHNOLOGY (SHENZHEN) COMPANY LIMITED, Guangdong (CN)

(72) Inventor: Zheng Huang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 451 days.

(21) Appl. No.: 18/329,897

(22) Filed: Jun. 6, 2023

(65) Prior Publication Data

US 2023/0316541 A1 Oct. 5, 2023

Related U.S. Application Data

(63) Continuation of application No. PCT/CN2022/130798, filed on Nov. 9, 2022.

(30) Foreign Application Priority Data

Jan. 18, 2022 (CN) .......................... 202210056206.0

(51) Int. Cl.
*G06T 7/20* (2017.01)
*G06T 17/20* (2006.01)
*G06V 10/764* (2022.01)

(52) U.S. Cl.
CPC ................ *G06T 7/20* (2013.01); *G06T 17/20* (2013.01); *G06V 10/764* (2022.01); *G06T 2207/30241* (2013.01)

(58) Field of Classification Search
CPC . G06T 7/20; G06T 17/20; G06T 2207/30241; G06T 13/20; G06T 7/246;
(Continued)

(56) References Cited

U.S. PATENT DOCUMENTS

| 10,699,490 B2 * | 6/2020 | Kinstner | ................. G06F 3/011 |
| 11,636,568 B2 * | 4/2023 | Hagland | ................... G06T 1/20 |
| | | | 345/506 |

(Continued)

FOREIGN PATENT DOCUMENTS

| CN | 101315703 A | 12/2008 |
| CN | 101819684 A | 9/2010 |
| | (Continued) | |

OTHER PUBLICATIONS

International Search Report for PCT/CN2022/130798, dated Jan. 20, 2023.
Written Opinion for PCT/CN2022/130798, dated Jan. 20, 2023.

*Primary Examiner* — Shefali D Goradia
(74) *Attorney, Agent, or Firm* — Sughrue Mion, PLLC

(57) ABSTRACT

Disclosed is a method for capturing a motion trajectory of a to-be-rendered virtual object, rendering a virtual object, and drawing a tracking primitive, including. determining at least one tracking primitive corresponding to a to-be-rendered virtual object in a virtual scene based on the to-be-rendered virtual object, the tracking primitive corresponding to the to-be-rendered virtual object covering a movable part of the to-be-rendered virtual object; drawing the tracking primitive corresponding to the to-be-rendered virtual object in the virtual scene; and capturing the motion trajectory of the to-be-rendered virtual object in the virtual scene based on a motion trajectory corresponding to the drawn tracking primitive.

20 Claims, 11 Drawing Sheets

(58) Field of Classification Search
     CPC ......... G06T 7/73; G06T 13/40; G06T 15/005;
                                          G06V 10/764
     See application file for complete search history.

(56)                    References Cited

U.S. PATENT DOCUMENTS 12,169,877 B2 *  12/2024  Hagland  .............. H04N 13/194
     2002/0133264 A1 *  9/2002  Maiteh  .............. G05B 19/4097
                                                          700/86

FOREIGN PATENT DOCUMENTS

CN          108961376  A     12/2018
CN          111383313  A      7/2020
CN          113064540  A      7/2021
CN          114419099  A      4/2022
JP          2017-188041  A    10/2017

* cited by examiner

100

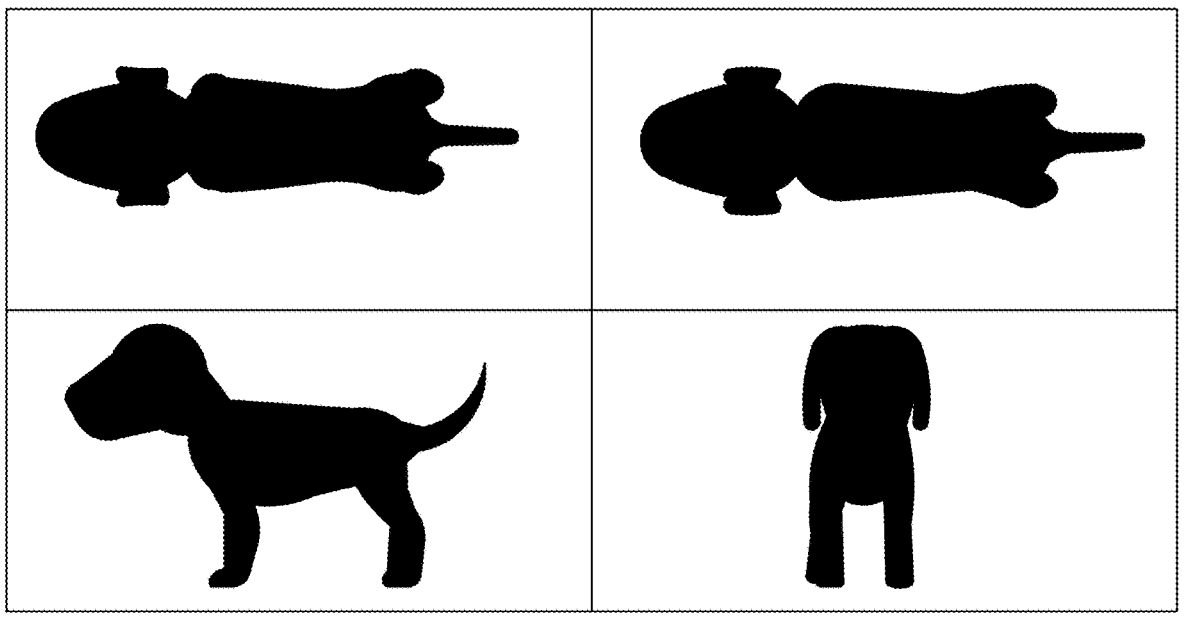

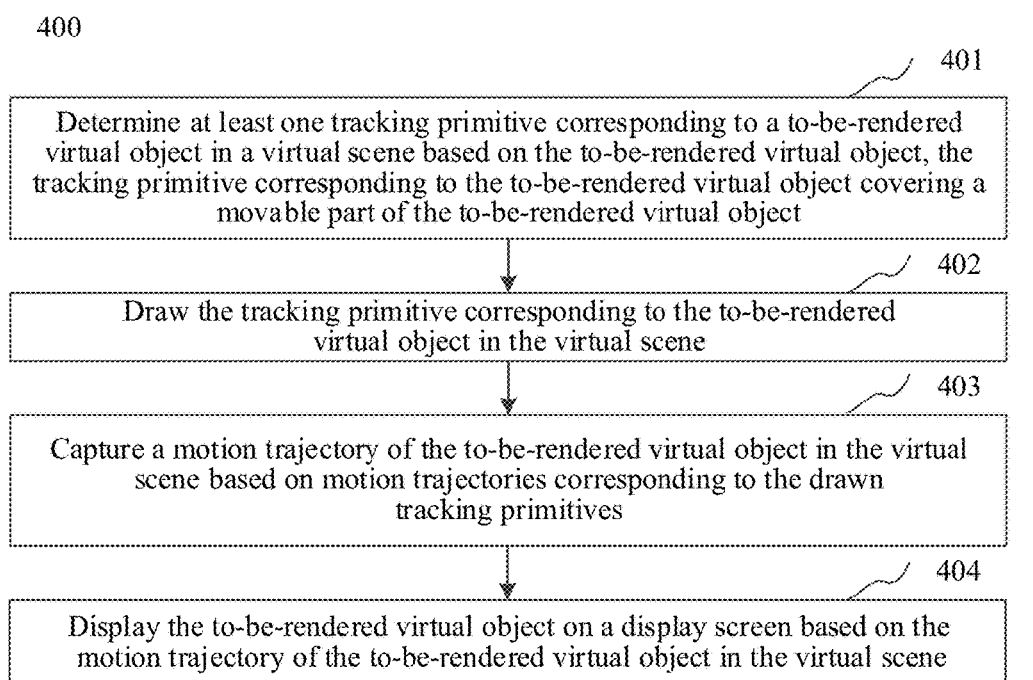

401

Determine at least one tracking primitive corresponding to a to-be-rendered virtual object in a virtual scene based on the to-be-rendered virtual object, the tracking primitive corresponding to the to-be-rendered virtual object covering a movable part of the to-be-rendered virtual object

402

Draw the tracking primitive corresponding to the to-be-rendered virtual object in the virtual scene

403

Capture a motion trajectory of the to-be-rendered virtual object in the virtual scene based on motion trajectories corresponding to the drawn tracking primitives

404

Display the to-be-rendered virtual object on a display screen based on the motion trajectory of the to-be-rendered virtual object in the virtual scene

Scene management module
701

Primitive creation module
702

Primitive drawing module
703

4000

4010

Computer-readable
instructions

Computer-readable
storage medium

4020

METHOD AND APPARATUS FOR CAPTURING MOTION TRAJECTORY OF TO-BE-RENDERED VIRTUAL OBJECT AND ELECTRONIC DEVICE

CROSS REFERENCE TO RELATED APPLICATIONS

This application is a continuation application of International Application No. PCT/CN2022/130798 filed on Nov. 9, 2022, which claims priority to Chinese Patent Application 202210056206.0, filed with the China National Intellectual Property Administration on Jan. 18, 2022, the disclosures of which are incorporated herein by reference in their entireties.

FIELD

This application relates to the field of cloud computing technologies, and in particular, to a method for capturing a motion trajectory of a to-be-rendered virtual object, a method for rendering a virtual object, an apparatus for capturing a motion trajectory of a to-be-rendered virtual object, an apparatus for rendering a virtual object, an electronic device, and a computer-readable storage medium.

BACKGROUND

A virtual environment may be built in scenes such as an electronic game or virtual reality, in order to display a 3D virtual object in the virtual environment. For example, a character, a scene, and basic terrain in a 3D game are all implemented by using three-dimensional models. A player can rotate a viewpoint to observe virtual objects from a plurality of angles, which increases the freedom and fun of the game.

In order to render a 3D virtual character for display the virtual object in the scene is often directly supplemented and drawn. However, directly drawing/tracking the virtual object in the scene has various problems. For example, direct rendering often results in a large number of redundant surfaces, which may lead to a large amount of computation. In addition, due to a large number of virtual objects being drawn in the same scene, if all the virtual objects in the scene are drawn/tracked, excessive computing resources may be occupied.

Therefore, there is a need for a method of reducing an excessively large amount of computation caused by the existing rendering technology, so as to reduce the occupation of computer resources.

SUMMARY

Provided is a method for capturing a motion trajectory of a to-be-rendered virtual object, a method for rendering a virtual object, a method for determining a tracking primitive, an apparatus for determining a tracking primitive, an electronic device, and a computer-readable storage medium are provided.

Some embodiments of the disclosure provides a method for capturing a motion trajectory of a to-be-rendered virtual object, the method being performed by an electronic device, and including: determining at least one tracking primitive corresponding to a to-be-rendered virtual object in a virtual scene based on the to-be-rendered virtual object, the tracking primitive corresponding to the to-be-rendered virtual object covering a movable part of the to-be-rendered virtual object;

drawing the tracking primitive corresponding to the to-be-rendered virtual object in the virtual scene; and capturing a motion trajectory of the to-be-rendered virtual object in the virtual scene based on a motion trajectory corresponding to the drawn tracking primitive.

The disclosure further provided a method for rendering a virtual object, performed by an electronic device, and the method including: drawing a tracking primitive corresponding to a to-be-rendered virtual object in a virtual scene, the drawn tracking primitive covering a movable part of the to-be-rendered virtual object and being not displayed on the display screen; capturing a motion trajectory of the to-be-rendered virtual object in the virtual scene based on a motion trajectory corresponding to the drawn tracking primitive; and displaying the to-be-rendered virtual object on a display screen based on the motion trajectory of the to-be-rendered virtual object in the virtual scene.

The disclosure further provides a method for drawing a tracking primitive, performed by an electronic device, where the tracking primitive is configured to assist in the rendering of a virtual object and the method includes: acquiring a motion state of a to-be-rendered virtual object in a virtual scene; determining at least one primitive identifier corresponding to the to-be-rendered virtual object based on the motion state of the to-be-rendered virtual object; and determining at least one tracking primitive corresponding to the to-be-rendered virtual object based on the at least one primitive identifier corresponding to the to-be-rendered virtual object, the tracking primitive corresponding to the to-be-rendered virtual object covering a movable part of the to-be-rendered virtual object; and drawing the tracking primitive corresponding to the to-be-rendered virtual object in the virtual scene.

The disclosure further provides an apparatus for capturing a motion trajectory of a to-be-rendered virtual object, including: a tracking primitive determination module, configured to determine at least one tracking primitive corresponding to a to-be-rendered virtual object in a virtual scene based on the to-be-rendered virtual object, the tracking primitive corresponding to the to-be-rendered virtual object covering a movable part of the to-be-rendered virtual object; a tracking primitive drawing module, configured to draw the tracking primitive corresponding to the to-be-rendered virtual object in the virtual scene; and a motion trajectory capture module, configured to capture a motion trajectory of the to-be-rendered virtual object in the virtual scene based on a motion trajectory corresponding to the drawn tracking primitive.

The disclosure further provides an apparatus for rendering a virtual object, including: a tracking primitive drawing module, configured to draw a tracking primitive corresponding to a to-be-rendered virtual object in a virtual scene, the drawn tracking primitive covering a movable part of the to-be-rendered virtual object; a motion trajectory capture module, configured to capture a motion trajectory of the to-be-rendered virtual object in the virtual scene based on a motion trajectory corresponding to the drawn tracking primitive; and a display module, configured to display the to-be-rendered virtual object on a display screen based on the motion trajectory of the to-be-rendered virtual object in the virtual scene.

The disclosure further provides an apparatus for drawing a tracking primitive, the tracking primitive being configured to assist rendering of a virtual object, and the apparatus including: a scene management module, configured to: acquire a motion state of a to-be-rendered virtual object in a virtual scene; and determine at least one primitive identifier corresponding to the to-be-rendered virtual object based on the motion state of the to-be-rendered virtual object; a primitive creation module, configured to: determine at least one tracking primitive corresponding to the to-be-rendered virtual object based on the at least one primitive identifier corresponding to the to-be-rendered virtual object, the tracking primitive corresponding to the to-be-rendered virtual object covering a movable part of the to-be-rendered virtual object; and a tracking primitive drawing module, configured to: draw the tracking primitive corresponding to the to-be-rendered virtual object in the virtual scene.

Some embodiments of the disclosure provide an electronic device, including: a processor; and a memory, storing computer instructions, the computer instructions, when executed by the processor, causing the processor to implement the foregoing method.

Some embodiments of the disclosure provide a computer-readable storage medium, storing computer instructions, the computer instructions, when executed by a processor, causing the processor to implement the foregoing method.

Some embodiments of the disclosure provide a computer program product, including computer-readable instructions, the computer-readable instructions, when executed by a processor, causing the processor to perform the foregoing method.

Details of one or more embodiments of the disclosure are provided in the accompanying drawings and descriptions below. Other features, objectives, and advantages of the disclosure become apparent from the specification, the drawings, and the claims.

BRIEF DESCRIPTION OF THE DRAWINGS

To describe the technical solutions in the embodiments of the disclosure more clearly, the following briefly describes the accompanying drawings required for describing the embodiments. Apparently, the accompanying drawings described below are merely exemplary embodiments of the disclosure, and a person of ordinary skill in the art may further obtain other accompanying drawings according to the accompanying drawings without creative efforts.

FIG. 3 is a schematic diagram of a projection surface of a to-be-rendered virtual object according to some embodiments of the disclosure.

FIG. 4 is a flowchart of a method for capturing a motion trajectory of a to-be-rendered virtual object according to some embodiments of the disclosure.

DETAILED DESCRIPTION

Figure 1:
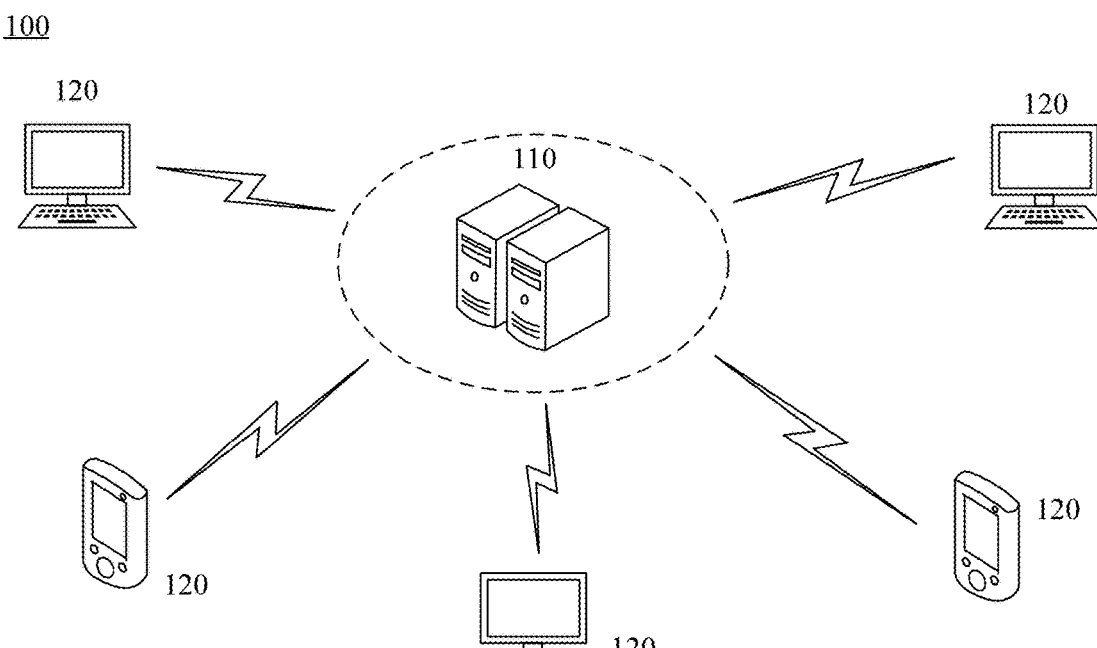
FIG. 1 is a schematic diagram of an application scene according to some embodiments of the disclosure.

In order to make objects, technical solutions, and advantages of the disclosure more obvious, certain embodiments according to the disclosure are described in detail below with reference to the drawings. The described embodiments are not to be construed as a limitation to the present disclosure. All other embodiments obtained by a person of ordinary skill in the art without creative efforts shall fall within the protection scope of the present disclosure In the following descriptions, related "some embodiments" describe a subset of all possible embodiments. However, it may be understood that the "some embodiments" may be the same subset or different subsets of all the possible embodiments, and may be combined with each other without conflict.

"Plurality of", as mentioned in the specification means two or more. "And/or" describes an association relationship for describing associated objects and represents that three relationships may exist. For example, A/B may represent the following cases: Only A exists, both A and B exist, and only B exists. The character "/" in this specification generally indicates an "or" relationship between the associated objects.

In this specification and accompanying drawings, substantially the same or similar operations and elements are denoted by the same or similar reference numerals, and repeated descriptions of these operations and elements are omitted. Meanwhile, in the description of the disclosure, the terms "first", "second" and the like are only used for distinguishing the description and are not to be understood as indicating or implying relative importance or order.

The solutions provided in the embodiments of the disclosure relate to cloud computing technology, which are specifically described by using the following embodiments. Hereinafter, a scene to which some embodiments of the disclosure may be applied is described with reference to FIG. 1 and FIG. 2. FIG. 1A is a schematic diagram of an application scene 100 according to some embodiments of the disclosure, where a server 110 and a plurality of terminals 120 are schematically shown. The terminal 120 and the server 110 may be directly or indirectly connected through wired or wireless communication, which is not limited in the disclosure.

For example, the server 110 may be an independent server, a server cluster composed of a plurality of physical servers, a distributed system, or a cloud server that provides basic cloud computing services such as a cloud service, a cloud database, cloud computing, a cloud function, cloud storage, a network service, cloud communication, a middleware service a domain name service, a security service, and a content delivery network (CDN), which is not specifically limited in this embodiment of the disclosure.

For example, each of the plurality of terminals 120 may be a fixed terminal such as a desktop computer or the like, such as a mobile terminal with network capabilities such as a smart phone, a tablet computer, a portable computer, a handheld device, a personal digital assistant, a smart wearable device, a vehicle terminal, or any combination thereof, which is not specifically limited in this embodiment of the disclosure.

In some embodiments, the server 110 and the terminal 120 can be connected through a network to achieve normal execution of a game application. The network may be the Internet of Things (IoT) based on the Internet and/or tele-communications network, which may be a wired network or a wireless network. For example, the network may be an electronic network that can realize information exchange functions such as a local area network (LAN), a metropolitan area network (MAN), a wide area network (WAN), and a cellular data communication network. A networked gaming application usually relies on a graphics card on the server to synthesize game picture that are displayed on the terminal (that is to say, rendering the game picture), and the gaming application is also referred to as a cloud game.

For example, the terminal 120 may transmit data of a game operated by a user to the server 110 through a control stream, and the server 110 returns one or more frames of audio frames and video frames to the terminal 120 through the data stream (such as in a steam manner). Moreover, the terminal 120 may also code the user operation (that is, an input event) and transmit the user operation to the server through the control stream. The server can also determine the corresponding one or more frames of the audio frames and video frames according to the received input event.

For example, the server 110 and the terminal 120 may transmit the data stream and the control stream through a protocol such as a real time streaming protocol (RTSP), a real-time transport protocol (RTP), or a real-time transport control protocol (RTCP). However, the disclosure is not limited thereto.

Figure 2:
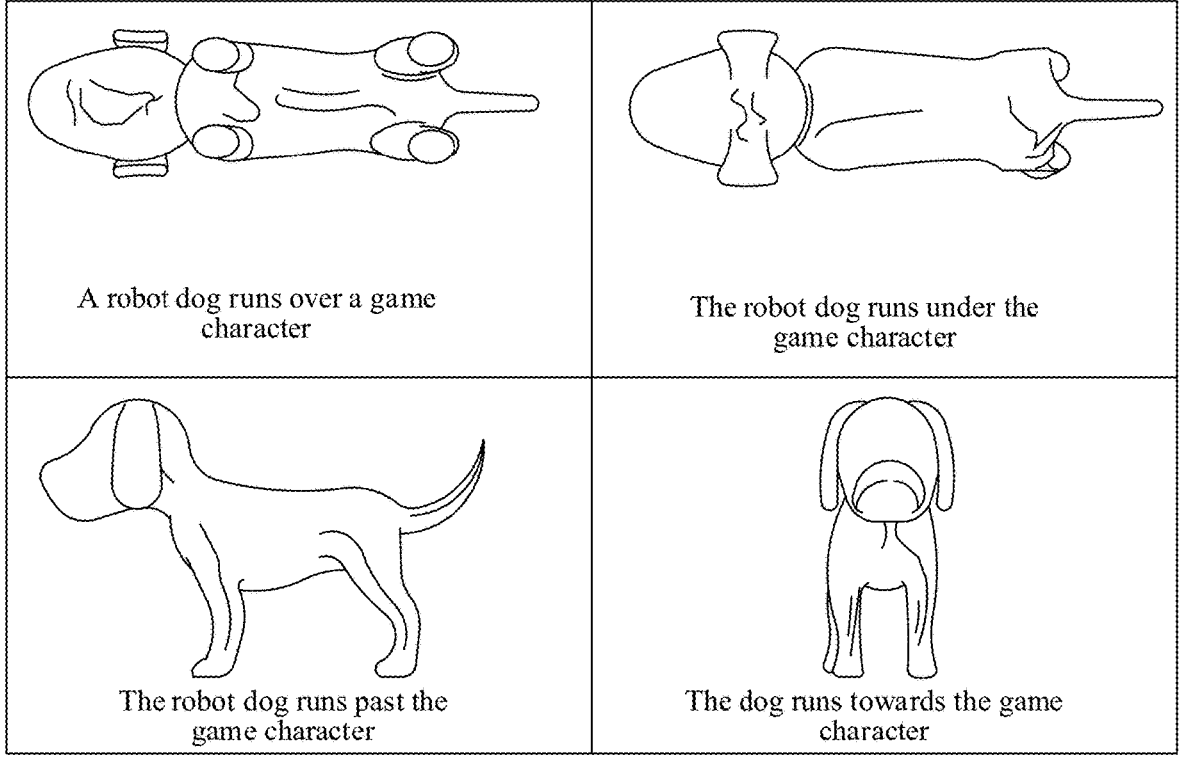
FIG. 2 is a schematic diagram of a to-be-rendered virtual object according to some embodiments of the disclosure.

For example, FIG. 2 shows four scenes that may occur in a certain cloud game. In the cloud game, a user manipulates a game character to track a virtual robot dog. For example, in some game video frames, the virtual robot dog may be running over a game character manipulated by the user, while in some game video frames, the virtual robot dog may be running under or next to the game character manipulated by the user, or running toward the game character manipulated by the user. It is to be understood by a person skilled in the art that FIG. 2 is only an exemplary scene, and the disclosure is not limited thereto.

In order to obtain the running virtual robot dog in each game video frame shown in FIG. 2, the server 110 encodes and renders the audio frame/video frame after acquiring the data of the game operated by the user in the terminal 120, and then transmits the encoded and rendered audio frame/video frame to the terminal 120 through the data stream. Moreover, in some other examples, based on the server 110 receives the input event of the user from the terminal 120, the server 110 may process a next audio frame/video frame of the cloud game or acquire a cloud game running result by reproducing the input event. The input event of the user may include, for example, at least one of instructions that direct a character in a game to advance, retreat, shoot, jump, or the like, the cloud game running result may include, for example, at least one of victory or failure of the game. The terminal 120 may decode the audio frame/video frame and then play the decoded audio frame/video frame after receiving the audio frame/video frame transmitted by the server 110 through the data stream.

The server 110 mainly uses a graphics card resource (such as a GPU computing resource) to code or render a plurality of virtual objects, to obtain various scene pictures as shown in FIG. 2. The graphics processing unit (GPU) computing resource mainly refers to a computing resource corresponding to the GPU. The GPU, also referred to as a display chip, is a microprocessor that specializes in image and graphics-related operations on a personal computer, a workstation, a game console, and some mobile devices. Certainly, in some embodiments, the server may also use the own CPU computing resource to perform the rendering operation. The Chinese name of CPU is central processing unit, which is mainly configured as an operation and control core of a computer system, and is a final execution unit for information processing and program operation.

For example, the rendering process is, for example, to generate the audio frame or the video frame by using a specific model of each cloud game. The specific model of each cloud game is a description of a strictly defined three-dimensional object or virtual scene using a language structure or data structure, which includes information such as geometry, viewpoints, textures, lighting, and shadows. For example, in a cloud game, when a game character controlled by the user travels to a certain location and triggers a game event (for example, a virtual robot dog suddenly appears), the model of the game can describe the scene of the game event (for example, the image of the virtual robot dog, including a shape of the virtual robot dog seen from the viewpoint of the game character controlled by the user, a texture of the clothe, a lighting condition, sound of the virtual robot dog, a background sound, and so on). The rendering computation can translate the descriptions into the audio frame and/or the video frame, forming the image that the user sees and hears at a game client.

In some embodiments, the CPU and GPU in server 110 may cooperate with each other to complete a single rendering. In some embodiments, the CPU and GPU operate in parallel and a command buffer exists between the CPU and GPU. For example, when the server requires to render a game video frame, the CPU submit an instruction (such as a draw call) to the command buffer to command the GPU to render. The CPU requires to process a lot of data calculations when submitting the draw call, such as some data, status, instructions, and so on. After the GPU of the server receives the draw call, the corresponding GPU unit can sequentially perform an operation such as vertex shadering, shape assembly, geometry shadering, rasterization, and fragment shadering to calculate a red, green, blue (RGB) value of each pixel in the video frame, and then acquire the image to be displayed on the game client.

Moreover, it may be understood that the apparatus for rendering may also be the terminal 120. That is to say, the method according to some embodiments of the disclosure may be completely or partially mounted on the terminal 120, to utilize the GPU computing resource and CPU resource of the terminal 120 to render the plurality of virtual objects or virtual scenes. Moreover, the rendering may also be performed by a system consisting of the terminal and the server, which is not limited in the disclosure.

However, in the rendering solution of the existing 3D model, the virtual object in the scene is often directly drawn to capture the motion trajectory of the virtual object. For example, as shown in FIG. 3, a schematic diagram of a projection surface of the virtual robot dog to be rendered is shown. To track the motion of the virtual robot dog in FIG. 2, the motion of the virtual robot dog is necessarily to be projected onto the corresponding motion plane, and then the motion of the virtual robot dog in FIG. 2 on the plane is tracked and recorded. For example, for the virtual robot dog running over or under the game character, the motion in a horizontal plane (that is, a plane formed by axis XY) can be tracked and recorded from a top view angle or a top view angle. For the virtual robot dog running beside the game character and the robot dog running towards the other side, the motion on the numerical plane can be tracked and recorded from the horizontal view angle.

Each of the projection surfaces is also referred to as a surface in the 3D rendering process, and the processing of each surface requires to submit a drawing, which is also referred to as the draw call. For example, the draw call is a rendering interface to which the CPU calls the rendering API once, such as DrawPrimitive or DrawlndexedPrimitive for DirectX, or glDrawElement or glDrawArrays for OpenGL.

In the 3D scene, the virtual object often requires to be drawn with high precision. As a result, more than one surface is often used for drawing one virtual object. In addition, a plurality of virtual objects generally wait to be rendered and drawn in the same scene, and a corresponding projection plane should be used for each virtual object to track and record the trajectory of the virtual object, Therefore, directly tracking the desired surface of each virtual object in the scene increases a quantity of draw calls. Even if the virtual object is clipped specially, the clipping algorithm will occupy considerable computing resources.

Therefore, the drawing or tracking of the virtual object by using a direct drawing solution occupies too much computing resources and cause performance degradation, which is equivalent to a huge amount of cropping and repeated drawing operations on the scene even in some in high-performance 3D rendering programs.

Based on the above, embodiments of the disclosure provide a method for capturing a motion trajectory of a to-be-rendered virtual object, a method for rendering a virtual object, a method for determining a tracking primitive, an apparatus for determining a tracking primitive, a method for drawing a tracking primitive, an apparatus for drawing a tracking primitive, an apparatus for capturing a motion trajectory of a to-be-rendered virtual object, an apparatus for rendering a virtual object, an electronic device, and a computer-readable storage medium. The embodiment of the disclosure uses the tracking primitive to replace the original virtual object in the scene, so that the 3D rendering program can achieve higher controllability and precision control of the motion tracking, reduce the amount of computation, and reduce the occupation of the computer resources. In addition, some embodiments of the disclosure further use modern multi-instance rendering techniques to reduce the quantity of hardware draw call, thereby optimizing the performance of the 3D rendering and improving the computational efficiency of the 3D rendering.

Figure 5A:
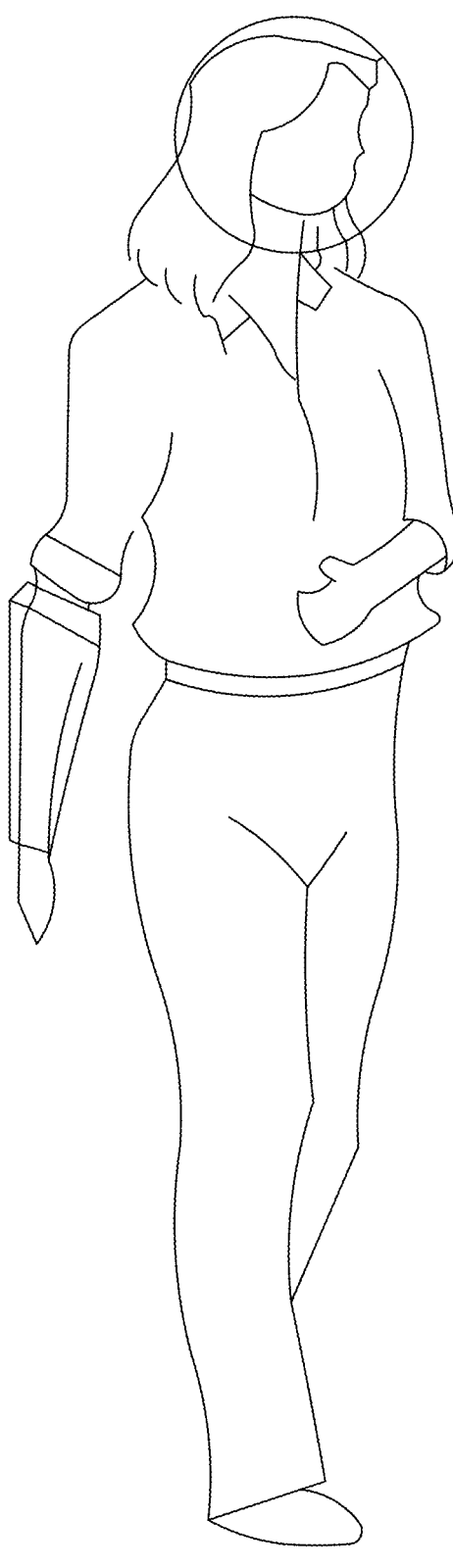
FIG. 5A is a schematic diagram of an example of a tracking primitive according to various embodiments of the disclosure.
Figure 5B:
FIG. 5B is a schematic diagram of another example of a tracking primitive according to various embodiments of the disclosure.
Figure 6:
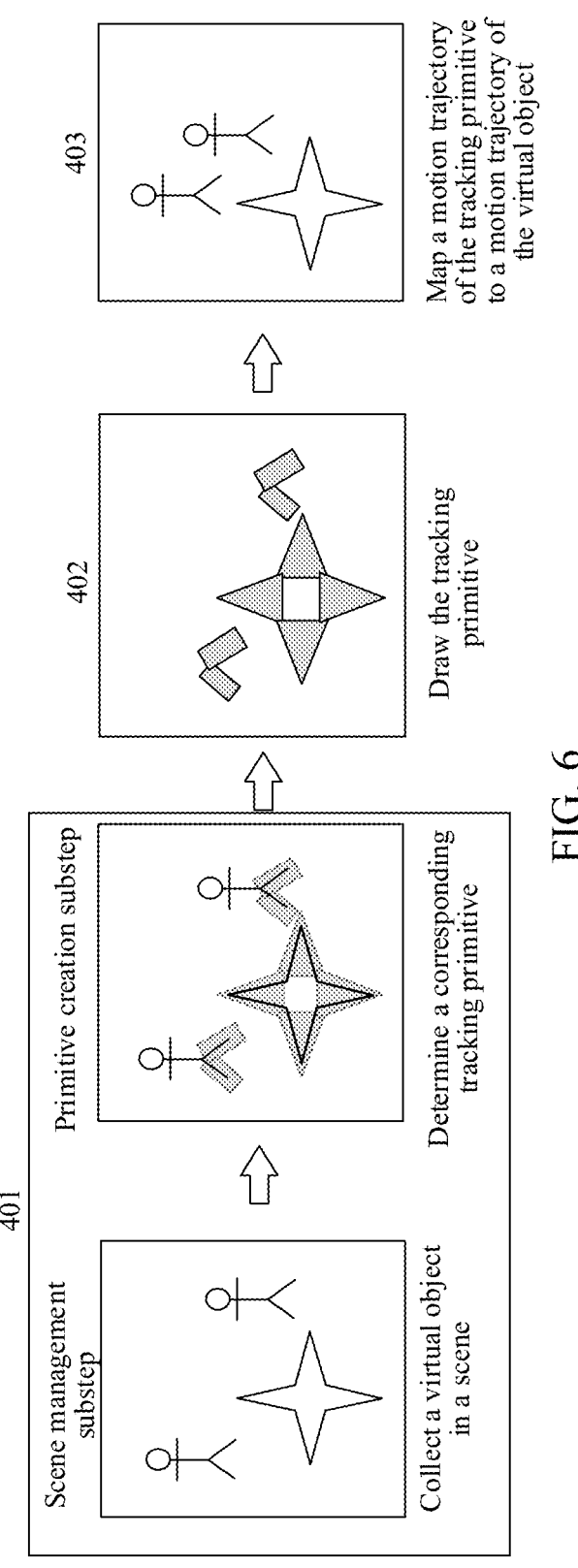
FIG. 6 is a schematic diagram of a method for capturing a motion trajectory of a to-be-rendered virtual object according to various embodiments of the disclosure.

The method involved in the embodiments of the disclosure are further described below with reference to FIG. 4 to FIG. 6. FIG. 4 is a flowchart of a method 400 for capturing a motion trajectory of a to-be-rendered virtual object according to some embodiments of the disclosure. FIG. 5A and FIG. 5B are schematic diagrams of an example of a tracking primitive according to various embodiments of the disclosure. FIG. 6 is a schematic diagram of a method for capturing a motion trajectory of a to-be-rendered virtual object according to various embodiments of the disclosure In some embodiments, embodiments corresponding to the method 400 include operation 401 to operation 402. Calculation corresponding to operation 401 is also referred to as an initialization phase of the method 400. Calculation corresponding to operation 402 to operation 403 are also referred to as a drawing phase of the method 400. It is to be understood by a person skilled in the art that the embodiments of the disclosure may further include other possible operations. The scope of the disclosure is not limited to the examples in FIG. 4 to FIG. 5A and FIG. 5B.

For example, prior to operation 401, the method 400 may further include one or more operations related to the creation or determination of the virtual scene and the to-be-rendered virtual object. For example, virtual environment may be a virtual environment displayed when an application program runs on a terminal. The virtual environment may be a simulated environment for the real world, a semi-simulated and semi-fictitious environment, or a purely fictitious environment. The virtual environment may be any one of a two-dimensional virtual environment, a 2.5-dimensional virtual environment, and a three-dimensional virtual environment, and this is not limited in the disclosure. The following embodiment illustrates the virtual environment as a three-dimensional virtual environment. The virtual object may be a movable object in the virtual environment. The movable object may be a virtual person, a virtual animal, an anime figure, and the like, such as a person, an animal, a plant, an oil barrel, a wall, or a stone displayed in the three-dimensional virtual environment. In some embodiments, the virtual object is a three-dimensional model created based on the animated skeleton technology. Each virtual object has its own shape and volume in the three-dimensional virtual environment, occupying a part of the space in the three-dimensional virtual environment. After the method 400, the to-be-rendered virtual object is rendered on the display screen, for example, the display screen of the terminal 120. When the to-be-rendered virtual object moves, the motion animation corresponding to the to-be-rendered virtual object is displayed on the display screen.

Moreover, embodiment of the disclosure also relates to computer vision (CV) technology. The CV is a science that studies how to use a machine to "see", and furthermore, that uses a camera and a computer to replace human eyes to perform machine vision such as recognition, tracking, and measurement on a target, and further perform graphic processing, so that the computer processes the target into an image more suitable for human eyes to observe, or an image transmitted to an instrument for detection. For example, in the case that the player using the terminal 120 controls the controlled virtual object, the virtual scene can be presented as a virtual scene "seen" from the viewing angle of the controlled virtual object. In this case, the controlled virtual object can be bound to a camera model in the 3D rendering process. The camera model is equivalent to the eyes of the 3D game world. The controlled virtual object can "see" the three-dimensional world of the game through the camera, and see various other virtual objects in the scene that might interact with the object. Certainly, other viewing angle may be provided, and one or more camera models are provided based on the viewing angle, and corresponding scene pictures are presented on the display screen of the terminal 120.

In some embodiments, a method for capturing a motion trajectory of a to-be-rendered virtual object is provided, which is performed by an electronic device. The electronic device may be a terminal or a server, and the method include the following operations:

Operation 401: Determine at least one tracking primitive corresponding to a to-be-rendered virtual object in a virtual scene based on the to-be-rendered virtual object, the tracking primitive corresponding to the to-be-rendered virtual object covering a movable part of the to-be-rendered virtual object.

In some embodiments, the to-be-rendered virtual object is a controlled virtual object that is currently in motion, such as a walking virtual character. The tracking primitive is a type of primitive. Specifically, the primitive is graphical data that correspond to entity visible on a drawing interface, such as some simple shapes in 3D or 2D space. The primitive may be simply described and drawn in a software. A common primitive in the 3D space includes a cube, a sphere, an ellipsoid, a cylinder, and the like. A common primitive in the 2D space includes a square, a circle, an oval, a rectangle, and the like. For example, the primitive is a basic unit that can be rendered in OpenGL, which is the geometry that can be drawn directly with glDrawArray or glDrawElement. In some embodiments, the primitive may be described by a series of vertexes. Each vertex includes a plurality of attributes, such as vertex coordinates of the primitive, a normal vector, a color, a depth value, and the like. The disclosure only illustratively illustrates the concept of the primitive, and the disclosure is not limited thereto.

Referring to FIG. 5A, the viewing angle corresponding to the camera model is a front left side of the virtual character. FIG. 5A schematically shows two tracking primitives corresponding to the virtual character. The two tracking primitives are head and right forearm of the virtual character. As yet another example, referring to FIG. 5B, the to-be-rendered virtual object includes not only the walking virtual character, but also houses and trees behind the walking virtual character. The viewing angle corresponding to the camera model is the front left side of the controlled virtual object. FIG. 5B schematically shows two tracking primitives corresponding to the controlled virtual object. The two tracking primitives are head and right forearm of the virtual character. As shown in FIG. 5B, in addition to the movable controlled virtual object, the tracking primitive is not provided for the stationary virtual object to reduce the number of surfaces drawn.

In some embodiments, the tracking primitive corresponding to the to-be-rendered virtual object follows a motion and an attitude of a mesh model corresponding to the to-be-rendered virtual object. Still referring to FIG. 5A, the tracking primitive may mask a mesh surface of the head and right forearm of a complex virtual character. For example, the head of the virtual character may correspond to a sphere-type tracking primitive, while the right forearm may correspond to a box-type tracking primitive. Further, referring to FIG. 5B, the head of the virtual character may correspond to the sphere-type tracking primitive. The circle filled with black lines and gray in FIG. 5B shows the sphere-type tracking primitive, while the right forearm may correspond to the box-type tracking primitive. The circle filled with black lines and gray in FIG. 5B shows the box-type tracking primitive. FIG. 5B further shows more than one virtual object, such as the virtual object corresponding to the houses and the trees. The virtual objects corresponding to the houses and the trees do not move. Therefore, in order to reduce the amount of calculation, the corresponding tracking primitive cannot be set for the virtual objects. Certainly, the disclosure is not limited thereto. In this embodiment, since the tracking primitive corresponding to the to-be-rendered virtual object follows the mesh model corresponding to the to-be-rendered virtual object, the tracking primitive can be set for the movable virtual object, which reduces the amount of calculation.

In some embodiments, the tracking primitives are automatically generated or created based on primitive identifiers. The primitive identifiers can be pre-marked by a developer in advance for each virtual object as a game character. For example, in some embodiments, the developer may set the primitive identifier for each virtual object in advance for collision detection, to avoid a conflict or superposition between elements of the virtual object. The tracking primitive of the disclosure may be multiplexed with the primitive identifier for the collision detection. It is to should be understood that although a collision detection primitive corresponding to the primitive identifier for the collision detection is also generated correspondingly in the possible collision detection, the collision detection primitive often abuts the mesh surface corresponding to the virtual object without covering a movable part of the virtual object. That is to say, in such a case, although the disclosure multiplexes the primitive identifier for the collision detection, the method 400 generates a tracking primitive different from the collision detection primitive based on such primitive identifier. Certainly, the disclosure is not limited thereto.

In some embodiments, operation 401, as the initialization stage, further includes a scene management sub-operation and a primitive creation sub-operation, and the scene management sub-operation and the primitive creation sub-operation determine the tracking primitive based on the primitive identifier. For example, referring to FIG. 6, the virtual object collected in the 3D virtual scene may also be diverse, with a variety of different geometries and mesh models. FIG. 6 simply shows some complex virtual objects in the 3D scene. Unlike the conventional solution in which the virtual objects in FIG. 6 are drawn directly, the mesh surfaces of these complex virtual objects are masked in operation 401 with a simple tracking primitive. To make tracking primitives as simple as possible to further reduce the amount of computation, operation 401 may use only three to five types of primitives to express all complex virtual object geometric features and motion trajectories. In some embodiments, these primitive types include a spherical, a (rounded) box, a quasi-cylinder, an ellipsoid, a triangular cone, and the like. Although the above primitive types are listed herein, other types of primitives may exist in practice. In some embodiments, these primitive types in the 2D scene include a circle, a (rounded corners) rectangle, an ellipse, a triangle, a square, a rectangle, and the like. No matter what type of primitive is used, even if the type of primitive not listed above is not used, the primitive may fall within the scope of the disclosure.

In some embodiments, the scene management sub-operation may be performed by a scene management module 701, which is described in detail subsequently. Specifically, the electronic device can obtain the motion state of the to-be-rendered virtual object in the virtual scene, and determine at least one primitive identifier corresponding to the to-be-rendered virtual object based on the motion state of the to-be-rendered virtual object in the scene management sub-operation. The electronic device determines at least one tracking primitive corresponding to the to-be-rendered virtual object based on the at least one primitive identifier corresponding to the to-be-rendered virtual object. After creating or determining the virtual scene, the electronic device can also provide the state of the controlled virtual object and the parameter collected from the environment where the controlled virtual object is located to a motion tracking system of the cloud game, to determine the moving or stationary virtual object in the virtual scene. In this embodiment, the primitive identifier is determined according to the motion state, and the tracking primitive is determined according to the primitive identifier, thereby realizing the purpose of determining the tracking primitive according to the motion state. To further reduce the amount of computation, only movable virtual objects can be tracked. Then, at least one primitive identifier corresponding to the to-be-rendered virtual object is added to the list of primitive identifiers. Specifically, the list of primitive identifiers is shown in Table 2 as detailed subsequently.

In some embodiments, to further reduce the amount of computation, the electronic device can also use a tracking primitive with a greater area to cover the movable part for the movable part with simple motion, infrequent changes, or small changes such as the torso. In order to improve the verisimilitude of the virtual scene, small and refined tracking primitives may also be configured to cover the movable part with a complex motion, a frequent change, or a large change, such as the face, the arm, and the hands.

In some embodiments, the primitive creation sub-operation may be performed by the primitive creation module 702, which is described in detail subsequently. Specifically, the electronic device is configured to: determine, based on the at least one primitive identifier corresponding to the to-be-rendered virtual object, whether the tracking primitive corresponding to the to-be-rendered virtual object is created; update a corresponding tracking primitive in a list of to-be-drawn primitives based on the tracking primitive corresponding to the to-be-rendered virtual object is created; and create the corresponding tracking primitive and adding the created tracking primitive to the list of to-be-drawn primitives based on the tracking primitive corresponding to the to-be-rendered virtual object is not created. Specifically, the list of to-be-drawn primitives is shown in Table 3 as detailed subsequently. In this embodiment, the tracking primitive is created and updated, which improves the management efficiency of the tracking primitive.

In operation 402, the tracking primitive corresponding to the to-be-rendered virtual object is drawn in the virtual scene.

The drawn tracking primitive is not displayed on the display screen.

In some embodiments, the electronic device may draw the tracking primitive determined above through the draw call. In the draw call, in addition to the attribute corresponding to the tracking primitive described in detail above, the draw call can also correspondingly increase the value related to the motion trajectory corresponding to the tracking primitive. For example, values related to the motion trajectories corresponding to the tracking primitives may be determined by the motion tracking system based on the tracking primitives created above. For example, in the virtual scene, the virtual control object controlled by the controlled virtual object and the surrounding virtual interaction object change correspondingly according to instructions issued by the end users. The CPU of the cloud server 110 determines the values related to the motion trajectory corresponding to each tracking primitive based on the various instructions triggered by the user of the terminal 120, and then submit these values to the GPU of the cloud server 110 for subsequent rendering through the draw call.

In some embodiments, the drawing the tracking primitive corresponding to the to-be-rendered virtual object further includes: determining an attribute change of the tracking primitive corresponding to the to-be-rendered virtual object based on interaction data of each virtual object in the virtual scene and operation data of a controlled virtual object; and; and drawing the tracking primitive corresponding to the to-be-rendered virtual object based on the attribute change corresponding to the tracking primitive. In this embodiment, the tracking primitive can be made to follow the motion and attitude of the mesh model of the original virtual object, and perform appropriate displacement transformation, scaling and rotation, thereby improving the tracking accuracy of the tracking primitive. In some embodiments, although the tracking primitives are not actually displayed on the display screen of the terminal 120, embodiments of the disclosure may utilize the tracking primitives to track the motion trajectory of the virtual object. For a game debugging/development scene, the tracking primitives can also be displayed on the display screen of a debugger or a developer, so that the debugger or the developer can make detailed adjustments to the game.

In some embodiments, the technique of instantiation may further be used in operation 402 to draw the tracking primitives. For example, operation 402 further includes: classifying the tracking primitives according to primitive types of the tracking primitives to obtain tracking primitive sets corresponding to the primitive types, and then for the tracking primitive set corresponding to each primitive type, submitting a draw call for drawing all of the tracking primitives of the tracking primitive set at once. For example, an electronic device may submit a draw call for drawing all tracking primitives in a tracking primitive set at a time through the glDrawArraysInstanced instructions or the glDrawElementsInstanced instructions in OpenGL. For another example, an electronic device may submit or call a draw call for drawing all tracking primitives in the tracking primitive set at a time through the DrawIndexedPrimitive instructions in direct3D, which is not limited in the disclosure. In this embodiment, the drawing of all tracking primitives of the same type can be completed in one draw call, which improves the operation efficiency. For example, all primitives of a triangular pyramid type are completed at one rendering call, and a number of draws for capturing the motion trajectory of the virtual object is reduced to three to five.

For still another example, the technique of indirect draw may further be used in operation 402 to draw the tracking primitives. Switching between fewer CPUs/GPUs during the rendering can be achieved through IndirectDraw or IndirectCompute. For example, virtual scene data may be prepared in the CPU and then submitted to the GPU at one time, which is not limited in the disclosure.

Operation 403: Capture, based on the motion trajectory corresponding to the drawn tracking primitive, the motion trajectory of the to-be-rendered virtual object in the virtual scene.

In some embodiments, the electronic device can determine the interaction data between the drawn tracking primitives based on the drawn tracking primitives, and then determine motion trajectories corresponding to the drawn tracking primitives based on the interaction data between the drawn transparent tracking primitives; and capture a motion trajectory of the to-be-rendered virtual object in the virtual scene based on motion trajectories corresponding to the drawn tracking primitives.

Specifically, the electronic device can further realize the mapping from the motion trajectory of the tracking primitive to the motion trajectory of the object to be rendered based on the fast rendering operation technique of a distance field. For example, the electronic device can draw the motion trajectory corresponding to the drawn tracking primitive into a target map or a buffer. Then, the electronic device can use the distance field function to quickly capture the tracking primitives that are drawn in batches according to the primitive types, thereby determining the motion trajectory of the object to be rendered. For example, the electronic device can use the signed distance field (SDF) function to implement the mapping from the motion trajectory of the tracking primitive to the motion trajectory of the object to be rendered. The SDF function can be represented by a scalar field function or a volume map, which implements the mapping from the tracking primitive to the object to be rendered by the distance from a point in space to a nearest triangular surface. For example, the electronic device can use the distance field function to sample a buffer (the process is also referred to as the trajectory pickup), and then determine whether a sampling point is within the trajectory of the tracking primitive through the sampled value, thereby determining the motion trajectory of the object to be rendered.

In this embodiment, the motion trajectories corresponding to the drawn tracking primitives are determined based on the interaction data between the drawn tracking primitives, which improves the accuracy of the motion trajectory.

In some embodiments, as shown in FIG. 4, the method 400 further includes operation 404. In operation 404, the to-be-rendered virtual object is displayed on the display screen based on the motion trajectory of the to-be-rendered virtual object in the virtual scene. Specifically, the electronic device can render the to-be-rendered virtual object in the virtual scene based on the motion trajectory of the to-be-rendered virtual object in the virtual scene, and display the to-be-rendered virtual object on the display screen. In this embodiment, since the to-be-rendered virtual object is displayed according to the motion trajectory of the to-be-rendered virtual object, the display position of the to-be-rendered virtual object can be accurately positioned according to the motion trajectory, thereby improving the display effect.

Accordingly, the operations are described in detail. In some other examples, however, the tracking primitive corresponding to the to-be-rendered virtual object is determined in advance. For example, in such an example, instead of creating the tracking primitive for the virtual object corresponding to the game character, the cloud game has been running smoothly for some time and can be directly responsible for rendering the virtual objects based on the known tracking primitives. Based on the above, the disclosure further provides a method for rendering a virtual object, which is performed by an electronic device. The electronic device may be a terminal or a server, and the method for rendering a virtual object includes: drawing a tracking primitive corresponding to a to-be-rendered virtual object in a virtual scene, the drawn tracking primitive covering a movable part of the to-be-rendered virtual object and being not displayed on the display screen; capturing a motion trajectory of the to-be-rendered virtual object in the virtual scene based on a motion trajectory corresponding to the drawn tracking primitive; and displaying the to-be-rendered virtual object on a display screen based on the motion trajectory of the to-be-rendered virtual object in the virtual scene. The embodiment of the disclosure uses the tracking primitive to replace the original virtual object (such as, the movable virtual object) in the scene, so that the 3D rendering program can achieve higher controllability and precision control of the motion tracking.

For another example, in some other examples, the virtual object may not need to be realistically rendered, and only the tracking primitives need to be determined for quick game testing. Based on the above, the disclosure further provides a method for determining a tracking primitive. The tracking primitive is configured to assist in the rendering of the virtual object and is performed by the electronic device. The electronic device may be a terminal or a server, and the method includes: acquiring a motion state of a to-be-rendered virtual object in a virtual scene; determining at least one primitive identifier corresponding to the to-be-rendered virtual object based on the motion state of the to-be-rendered virtual object; determining at least one tracking primitive corresponding to a to-be-rendered virtual object in a virtual scene based on the to-be-rendered virtual object, the tracking primitive corresponding to the to-be-rendered virtual object covering a movable part of the to-be-rendered virtual object; and drawing the tracking primitive corresponding to the to-be-rendered virtual object in the virtual scene. In some embodiments, the drawn tracking primitive is not displayed on the display screen for a game player. For a game debugging/development scene, the tracking primitives can also be displayed on the display screen of a debugger or a developer, so that the debugger or the developer can make detailed adjustments to the game. The embodiment of the disclosure uses the tracking primitive to replace the original virtual object (such as, the movable virtual object) in the scene, so that the 3D rendering program can achieve higher controllability and precision control of the motion tracking. In some embodiments, the embodiment of the disclosure may also arrange the tracking primitive only on parts of the movable virtual object, thereby avoiding the direct rendering and tracking of all aspects of each virtual object in the scene and further reducing the occupation of the computing resources.

In addition, some embodiments of the disclosure further use modern multi-instance rendering techniques to reduce the quantity of hardware draw call, thereby optimizing the performance of the 3D rendering and improving the computational efficiency of the 3D rendering.

The apparatus 700 involved in the embodiments of the disclosure are further described below with reference to FIG. 7A to FIG. 7D.

In some embodiments, the apparatus 700 in various embodiments of the disclosure includes a scene management module 701, a primitive creation module 702, and a primitive drawing module 703.

In some embodiments, the scene management module 701 is configured to: acquire a motion state of a to-be-rendered virtual object in a virtual scene; determine at least one primitive identifier corresponding to the to-be-rendered virtual object based on the motion state of the to-be-rendered virtual object; and add at least one primitive identifier corresponding to the to-be-rendered virtual object to a list of primitive identifiers. That is to say, the scene management module 701 can be configured to manage the movable virtual objects (such as the virtual robot dog in FIG. 2) within the virtual scene, observe the motion state and record the movable virtual objects.

Figure 7A:
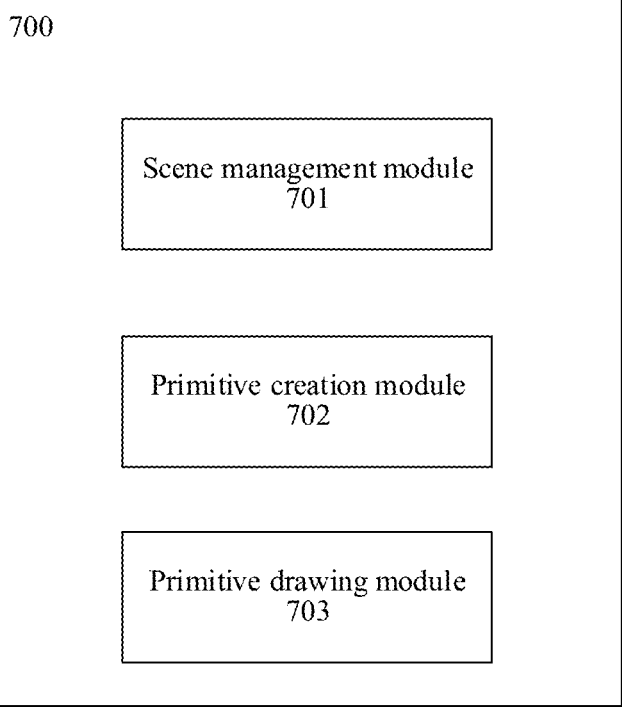
FIG. 7A is a schematic diagram of an apparatus for drawing a tracking primitive according to various embodiments of the disclosure.
Figure 7B:
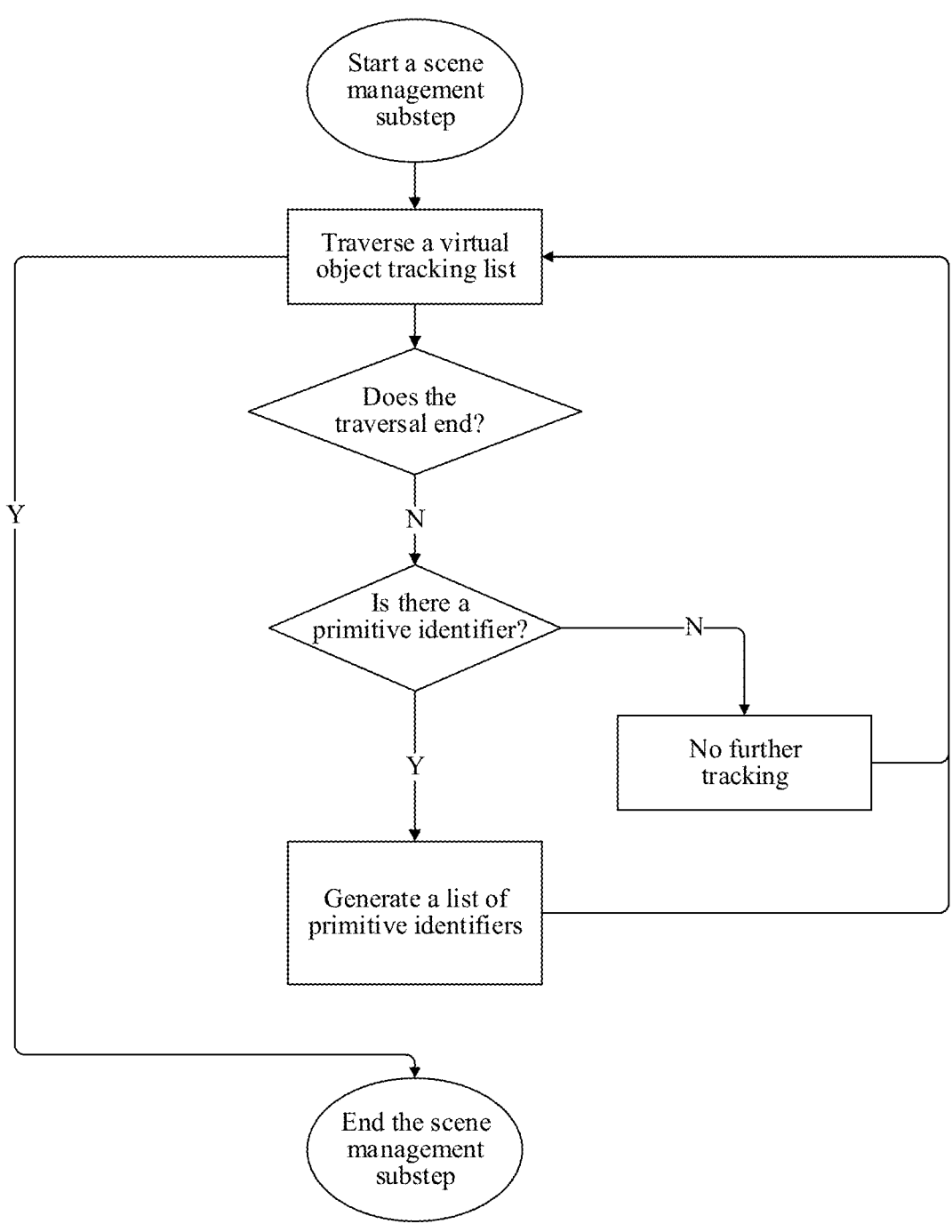
FIG. 7B is a flowchart corresponding to operations that a scene management module of an apparatus for drawing a tracking primitive is configured to perform according to various embodiments of the disclosure.

In some embodiments, the scene management module 701 may perform the operations shown in FIG. 7B. During the game, when the terminal 120 or the server 110 determines that the virtual object in the scene needs to be rendered, the scene management module 701 traverses a virtual object tracking list. An example of the virtual object tracking list is shown in Table 1.

TABLE 1

| Virtual object tracking list | | |
|---|---|---|
| Virtual object | Attribute value of virtual object | Primitive of virtual object |
| Robot dog | Stationary | Sphere-QA, Rounded box HA |
| Virtual Character B | In motion | Sphere-QB, Rounded box HB |
| Male character C | Stationary | Sphere-QC, Rounded box HC |
| . . . | . . . | . . . |

In the process of traversing the virtual object tracking list, the scene management module 701 first needs to determine the motion state of the current virtual object to determine whether to track the virtual object. For example, if the virtual object is a stationary object (such as, a land, a grass, and the like) or does not affect the rendering of the game picture even if the rendering result is not updated for the virtual object, the scene management module 701 determines that the virtual object does not need to be tracked. The scene management module 701 determines whether the virtual object includes the primitive identifier for the virtual object that may be in motion. The scene management module 701 may identify the primitive identifier on the virtual object and generate a list of primitive identifiers. An example of the list of primitive identifiers is shown in Table 2.

TABLE 2

| List of primitive identifiers |
|---|
| Primitive identifiers |
| QB |
| HB |
| . . . |

For example, the scene management module 701 may add the primitive identifiers of the virtual object to the list of primitive identifiers if the primitive identifiers of the virtual object are not included in the list of primitive identifiers. The scene management module 701 may update the data of the primitive identifiers if the primitive identifiers of the object are not included in the list of primitive identifiers. In some embodiments, in some embodiments, the scene management module 701 may also delete the primitive in the list of primitive identifiers if the scene management module 701 determines that a certain primitive is not necessarily to be tracked. In this example, the scene management module 701 may cyclically perform the above process until all virtual objects in the virtual object tracking list are traversed.

In some embodiments, the primitive creation module 702 is configured to: determine, based on the at least one primitive identifier corresponding to the to-be-rendered virtual object, whether the tracking primitive corresponding to the to-be-rendered virtual object is created; update a corresponding tracking primitive in a list of to-be-drawn primitives based on the tracking primitive corresponding to the to-be-rendered virtual object is created; and create the corresponding tracking primitive and adding the created tracking primitive to the list of to-be-drawn primitives based on the tracking primitive corresponding to the to-be-rendered virtual object has not been created. In this way, the primitive creation module 702 can be configured to match the movable virtual object in the scene, and generate a tracking primitive with corresponding transformation attributes (position, zoom, and rotation) for the movable virtual object.

Figure 7C:
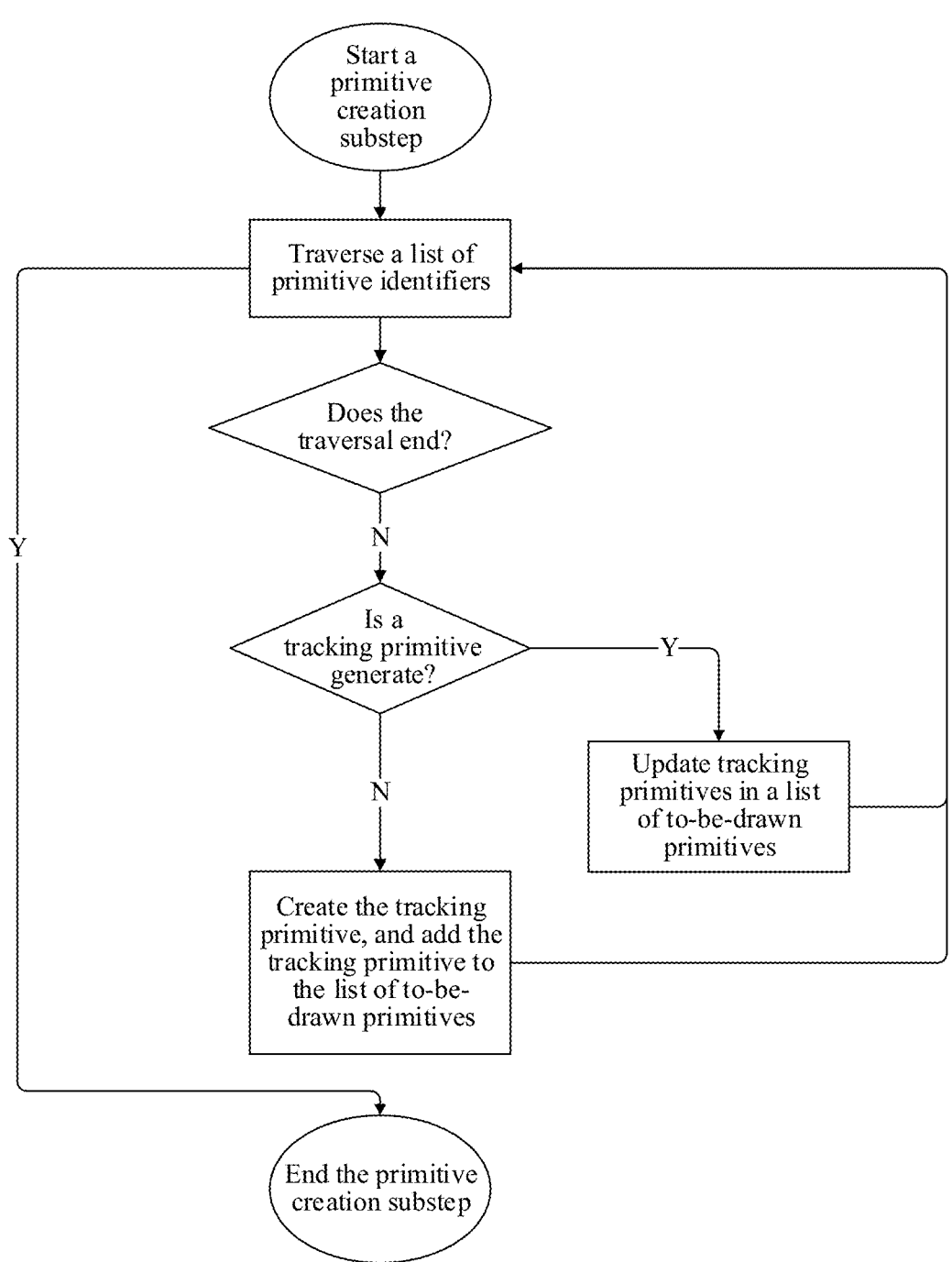
FIG. 7C is a flowchart corresponding to operations performed by a primitive creation module of an apparatus for drawing a tracking primitive according to various embodiments of the disclosure.

In some embodiments, the primitive creation module 702 is to perform the operations shown in FIG. 7C. The primitive creation module 702 traverses the foregoing list of primitive identifiers. In the process of traversing the list of primitive identifiers, the primitive creation module 702 may determine information corresponding to a current primitive to create the corresponding tracking primitive. For example, the primitive creation module 702 determines attributes corresponding to the tracking primitive based on the primitive identifiers, and create the tracking primitive based on the attributes. In the example, the primitive creation module 702 cyclically performs the foregoing process until all the primitive identifiers in the list of primitive identifiers are traversed. An example of the list of to-be-drawn primitives is shown in Table 3.

TABLE 3

| List of to-be-drawn primitives | |
|---|---|
| Primitive identifiers | Primitive attributes |
| QB | Center of sphere, radius |
| HB | Vertices B1, B2, . . . |
| . . . | . . . |

In some embodiments, the primitive drawing module 703 is configured to draw the tracking primitive corresponding to a to-be-rendered virtual object in the virtual scene. In this way, the primitive drawing module 703 may be configured to collect generated primitives, record information about the primitives, and finally submit the information to the GPU for drawing.

Figure 7D:
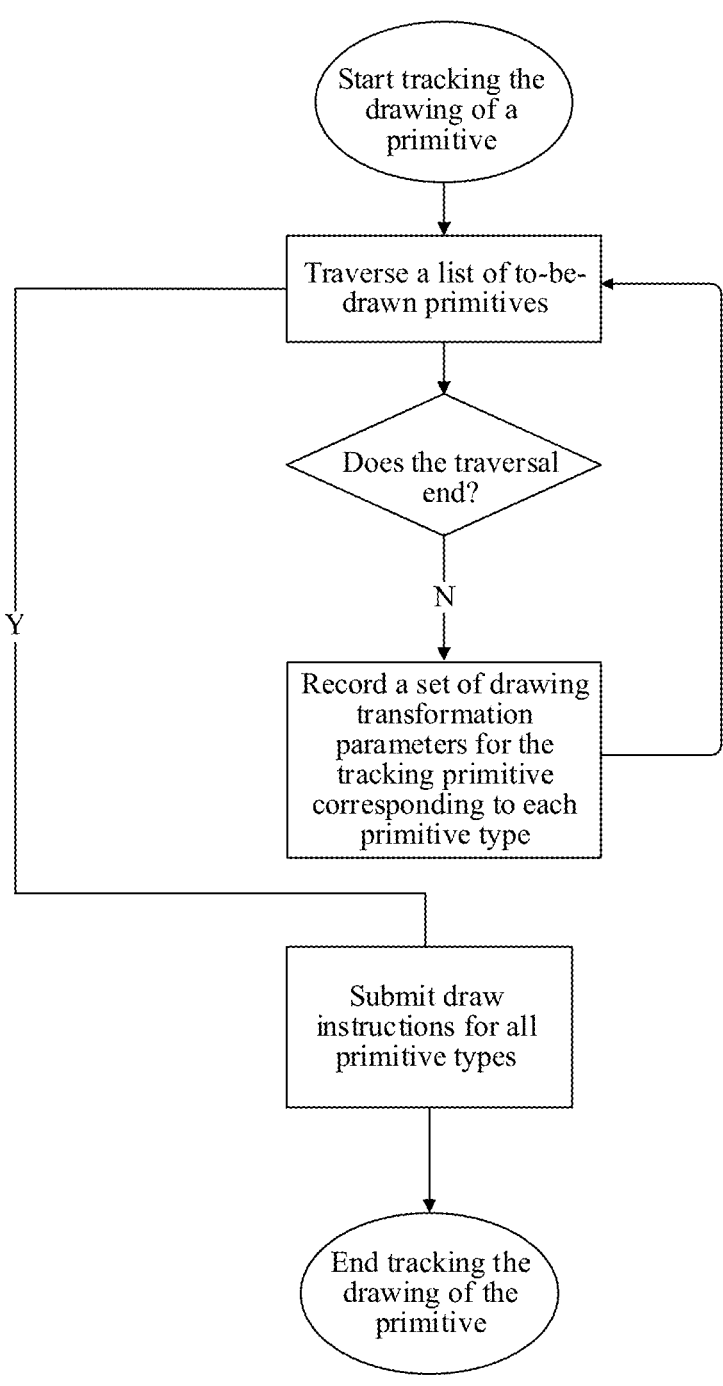
FIG. 7D is a flowchart corresponding to operations performed by a primitive drawing module of an apparatus for drawing a tracking primitive according to various embodiments of the disclosure.

In some embodiments, the primitive drawing module 703 is to perform the operations shown in FIG. 7D. The primitive drawing module 703 traverses a list of to-be-drawn primitives. During transversal of the list of to-be-drawn primitives, the primitive drawing module 703 classifies and records the primitive identifiers according to primitive types corresponding to the primitive identifiers, so as to facilitate generation of subsequent instanced draw instructions or indirect draw instructions. For example, the primitive drawing module 703 may record a set of drawing transformation parameters for each primitive type as shown in FIG. 7D, and then submit draw calls for all the primitive types. For another example, the primitive drawing module 703 may arrange and generate the instanced draw instructions or the indirect draw instructions corresponding to the following list of draw instructions.

TABLE 4

| List of draw instructions | | | |
|---|---|---|---|
| Instruction identifiers | Primitive type | Primitive identifiers | Primitive attributes |
| Instruction 1 | Sphere | QB . . . | (Center of sphere, radius) . . . |
| Instruction 2 | Rounded box | HB . . . | (Vertices B1, B2, . . . ) . . . |
| . . . | . . . | . . . | . . . |

An example of the list of draw instructions is shown in Table 4. In the example, the primitive drawing module 703 cyclically performs the foregoing process until all the primitive identifiers in the list of to-be-drawn primitives are traversed.

In this way, the apparatus 700 uses the tracking primitive to replace the original virtual object in the scene, so that the 3D rendering process can achieve higher controllability and precision control of the motion tracking. In addition, some embodiments of the disclosure further use the modern multi-instance rendering techniques to reduce the number of hardware draw calls, thereby optimizing the performance of 3D rendering and improving the computational efficiency of the 3D rendering.

Moreover, according to still another aspect of the disclosure, an apparatus for capturing a motion trajectory of a to-be-rendered virtual object is further provided, including: a tracking primitive determination module, configured to determine at least one tracking primitive corresponding to a to-be-rendered virtual object in a virtual scene based on the to-be-rendered virtual object, the tracking primitive corresponding to the to-be-rendered virtual object covering a movable part of the to-be-rendered virtual object; a tracking primitive drawing module, configured to draw the tracking primitive corresponding to the to-be-rendered virtual object in the virtual scene; and a motion trajectory capture module, configured to capture a motion trajectory of the to-be-rendered virtual object in the virtual scene based on a motion trajectory corresponding to the drawn tracking primitive.

In some embodiments, the tracking primitive drawing module is further configured to: classify the tracking primitives according to primitive types of the tracking primitive, so as to obtain a tracking primitive set corresponding to each of the primitive types; and for the tracking primitive set corresponding to each primitive type, submit a draw call for drawing all of the tracking primitives of the tracking primitive set at once.

In some embodiments, the tracking primitive drawing module is further configured to: determine an attribute change of the tracking primitive corresponding to the to-be-rendered virtual object based on interaction data of each virtual object in the virtual scene and operation data of a controlled virtual object; and draw the tracking primitive corresponding to the to-be-rendered virtual object based on the attribute change corresponding to the tracking primitive.

In some embodiments, the apparatus for capturing a motion trajectory of a to-be-rendered virtual object is further configured to: determine interaction data between the drawn tracking primitives based on the drawn tracking primitives; and determine motion trajectories corresponding to the drawn tracking primitives based on the interaction data between the drawn transparent tracking primitives.

In some embodiments, the tracking primitive determination module is further configured to: acquire a motion state of a to-be-rendered virtual object in a virtual scene; determine at least one primitive identifier corresponding to the to-be-rendered virtual object based on the motion state of the to-be-rendered virtual object; and determine at least one tracking primitive corresponding to the to-be-rendered virtual object based on the at least one primitive identifier corresponding to the to-be-rendered virtual object.

In some embodiments, the tracking primitive determination module includes a primitive creation module. The primitive creation module is configured to: determine, based on the at least one primitive identifier corresponding to the to-be-rendered virtual object, whether the tracking primitive corresponding to the to-be-rendered virtual object is created; update a corresponding tracking primitive in a list of to-be-drawn primitives based on the tracking primitive corresponding to the to-be-rendered virtual object is created; and create the corresponding tracking primitive and adding the created tracking primitive to the list of to-be-drawn primitives based on the tracking primitive corresponding to the to-be-rendered virtual object has not been created.

In some embodiments, the apparatus for capturing a motion trajectory of a to-be-rendered virtual object is further configured to: display the to-be-rendered virtual object on a display screen based on the motion trajectory of the to-be-rendered virtual object in the virtual scene.

According to still another aspect of the disclosure, an apparatus for rendering a virtual object is provided, including: a tracking primitive drawing module, configured to draw a tracking primitive corresponding to a to-be-rendered virtual object in a virtual scene, the drawn tracking primitive covering a movable part of the to-be-rendered virtual object; a motion trajectory capture module, configured to capture a motion trajectory of the to-be-rendered virtual object in the virtual scene based on a motion trajectory corresponding to the drawn tracking primitive; and a display module, configured to display the to-be-rendered virtual object on a display screen based on the motion trajectory of the to-be-rendered virtual object in the virtual scene.

In some embodiments, the tracking primitive drawing module is further configured to: classify the tracking primitives according to primitive types of the tracking primitive, so as to obtain a tracking primitive set corresponding to each of the primitive types; and for the tracking primitive set corresponding to each primitive type, submit a draw call for drawing all of the tracking primitives of the tracking primitive set at once.

Figure 8:
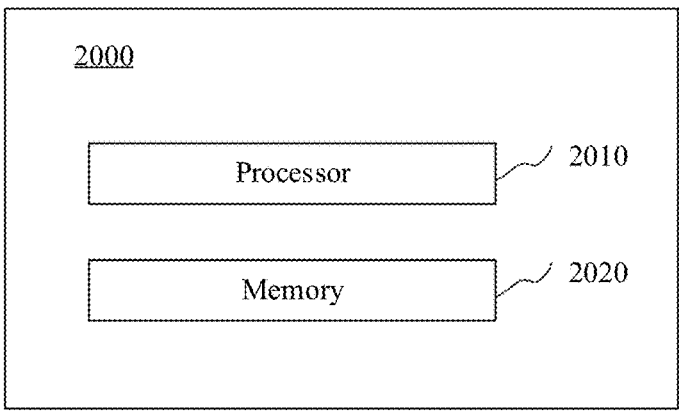
FIG. 8 is a schematic diagram of an electronic device according to some embodiments of the disclosure.

Moreover. according to yet still another aspect of the disclosure, an electronic device configured to implement the method according to some embodiments of the disclosure. FIG. 8 is a schematic diagram of an electronic device 2000 according to some embodiments of the disclosure.

As shown in FIG. 8, the electronic device 2000 may include one or more processors 2010, and one or more memories 2020. The memory 2020 stores computer-readable codes. The computer-readable codes, when run by one or more processors 2010, may perform the search request processing method as described above.

The processor in some embodiments of the disclosure may be an integrated circuit chip and has a signal processing capability. The foregoing processor may be a general purpose processor, a digital signal processor (DSP), an application-specific integrated circuit (ASIC), a field programmable gate array (FPGA), or another programmable logical device, discrete gate or transistor logical device, or discrete hardware component. The processor may implement or perform the methods, the operations, and logic block diagrams disclosed in some embodiments of the disclosure. The general purpose processor may be a microprocessor, or the processor may be any conventional processor or the like, and may be an X86 architecture or an ARM architecture.

Generally, various exemplary embodiments of the disclosure may be implemented in hardware or special purpose circuitry, software, firmware, logic, or any combination thereof. Some aspects can be implemented in the hardware, while others can be implemented in the firmware or the software that can be executed by a controller, a microprocessor, or other computing device. When aspects of some embodiments of the disclosure are illustrated or described as block diagrams, flowcharts, or some other graphical representation, it is to be understood that the blocks, apparatus, systems, techniques, or methods described herein may be implemented as non-limiting examples in hardware, software, firmware, special purpose circuit or logic, general purpose hardware or controller or other computing devices, or some combination thereof.

Figure 9:
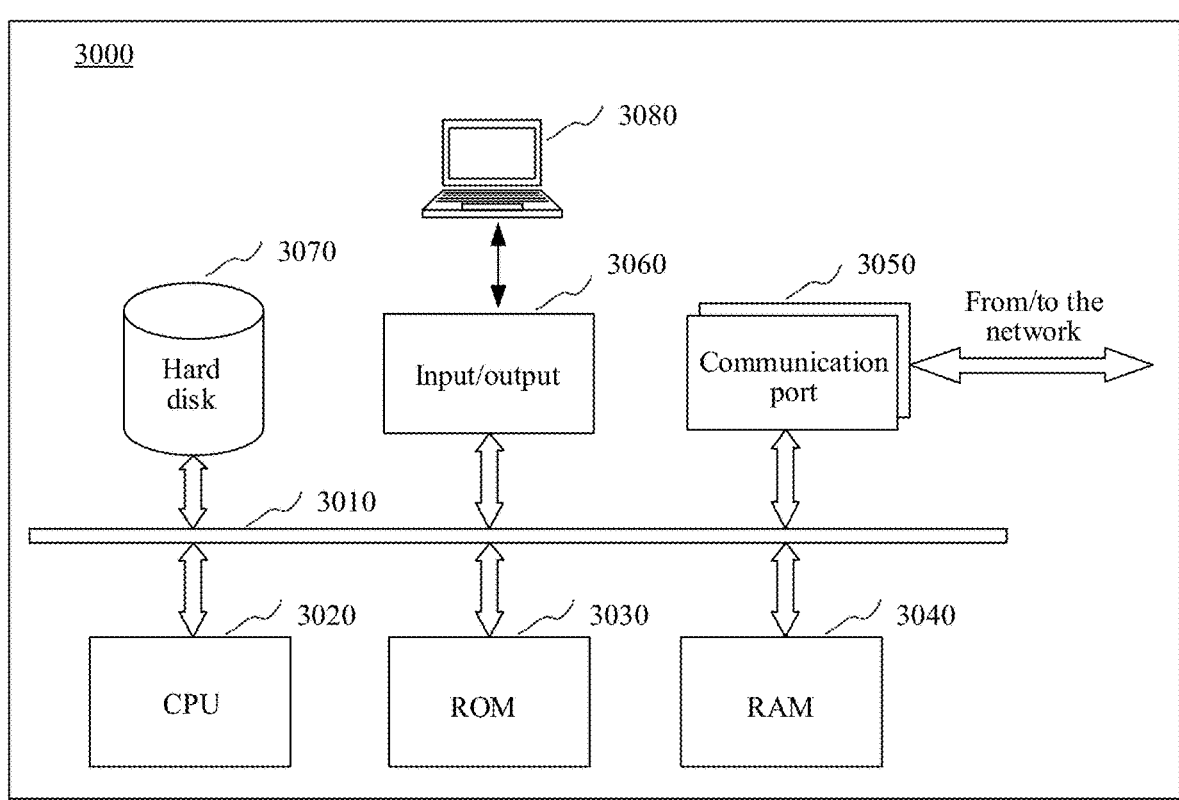
FIG. 9 is a schematic diagram of a computer architecture according to some embodiments of the disclosure.

For example, the method or the apparatus according to some embodiments of the disclosure may also be implemented by means of the architecture of the computing device 3000 shown in FIG. 9. As shown in FIG. 9, the computing device 3000 may include a bus 3010, one or more CPUs 3020, a read only memory (ROM) 3030, a random access memory (RAM) 3040, a communication port 3050 connected to the network, an input/output component 3060, a hard disk 3070, and so on. The storage device in the computing device 3000, such as the ROM 3030 or the hard disk 3070, may store various data or files used in the processing and/or communication of the method for determining a driving risk of a vehicle provided by the disclosure and the program instructions executed by the CPU. The computing device 3000 may further include a user interface 3080. Certainly, the architecture shown in FIG. 9 is only exemplary, and one or more components of the computing device illustrated in FIG. 9 may be omitted depending on a practical need, when implementing different devices.

Figure 10:
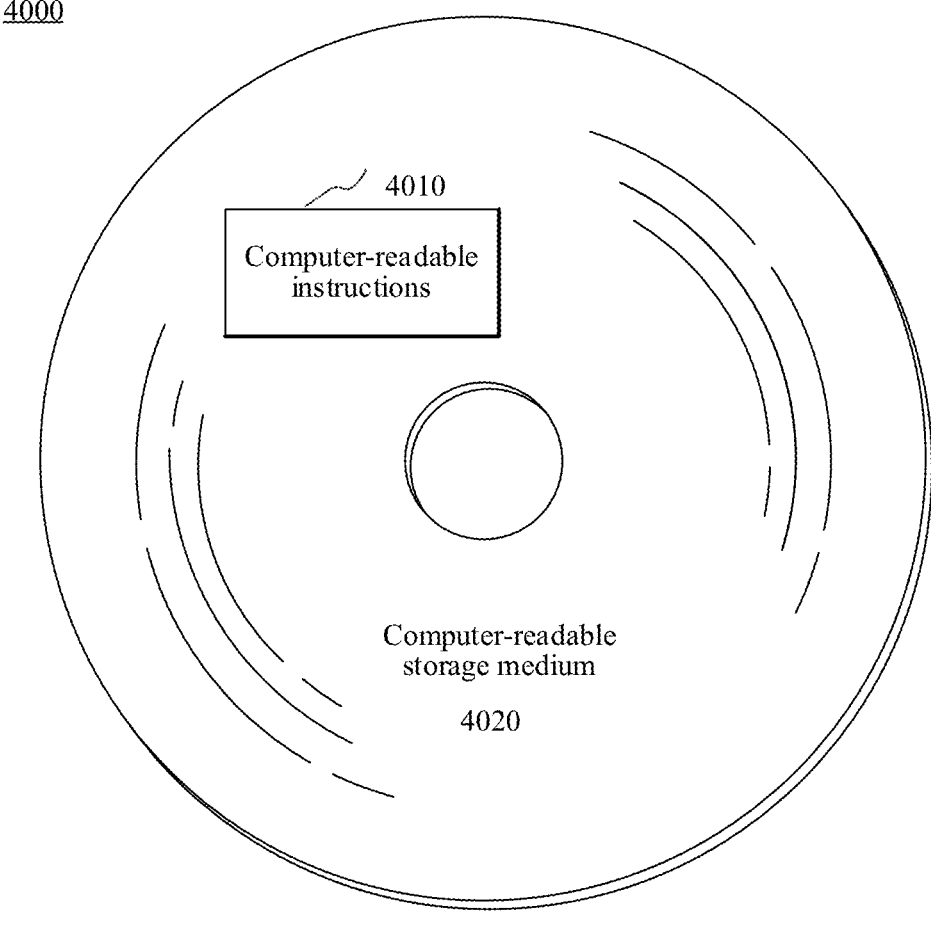
FIG. 10 is a schematic diagram of a computer-readable storage medium according to some embodiments of the disclosure.

According to still another aspect of the disclosure, a computer-readable storage medium is further provided. FIG. 10 shows a storage media 4000 according to the disclosure.

As shown in FIG. 10, computer-readable instructions 4010 are stored on the computer storage medium 4020. The computer-readable instructions 4010, when executed by a processor, may perform the method according to some embodiments of the disclosure described with reference to the foregoing accompanying drawings. The computer-readable storage medium in some embodiments of the disclosure may be a volatile memory or a non-volatile memory, or may include both the volatile memory and the non-volatile memory. The non-volatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), which is used as an external cache. Through illustrative but not limited description, RAMs in many forms, for example, a static random access memory (SRAM), a dynamic random access memory (DRAM), a synchronous dynamic random access memory (SDRAM), a double data rate synchronous dynamic random access memory (DDRSDRAM), an enhanced synchronous dynamic random access memory (ESDAM), a synchronous link dynamic random access memory (SLDRAM), and a direct memory bus random access memory (DRRAM), are available. It is to be understood that the memory in the method described in this specification is intended to include, but is not limited to these memories and any other suitable types. It is to be understood that the memory in the method described in this specification is intended to include, but is not limited to these memories and any other suitable types.

According to some embodiments of the disclosure, a computer program product is provided. The computer program product includes computer instructions, and the computer instructions are stored in the computer-readable storage medium. The processor of the computer device reads the computer instruction from the computer-readable storage medium. The processor executes the computer instruction, so that the computer device performs the method according to some embodiments of the disclosure.

It is to be understood that the flowcharts and block diagrams in the accompanying drawings illustrate possible system architectures, functions and operations that may be implemented by a system, a method, and a computer program product according to various embodiments of the disclosure. In this regard, each box in a flowchart or a block diagram may represent a module, a program segment, or a part of code. The module, the program segment, or the part of code includes one or more executable instructions used for implementing designated logic functions. In some implementations used as substitutes, functions annotated in boxes may in some embodiments occur in a sequence different from that annotated in an accompanying drawing. For example, actually two boxes shown in succession may be performed basically in parallel, and sometimes the two boxes may be performed in a reverse sequence. This is determined by a related function. It is to be understood that, each box in a block diagram and/or a flowchart and a combination of boxes in the block diagram and/or the flowchart may be implemented by using a dedicated hardware-based system configured to perform a specified function or operation, or may be implemented by using a combination of dedicated hardware and a computer instruction.

Generally, various exemplary embodiments of the disclosure may be implemented in hardware or special purpose circuitry, software, firmware, logic, or any combination thereof. Some aspects can be implemented in the hardware, while others can be implemented in the firmware or the software that can be executed by a controller, a microprocessor, or other computing device. When aspects of some embodiments of the disclosure are illustrated or described as block diagrams, flowcharts, or some other graphical representation, it is to be understood that the blocks, apparatus, systems, techniques, or methods described herein may be implemented as non-limiting examples in hardware, software, firmware, special purpose circuit or logic, general purpose hardware or controller or other computing devices, or some combination thereof.

The exemplary embodiments of the disclosure described in detail above are merely illustrative and are not restrictive. It is to be understood by a person skilled in the art that various modifications and combinations of these embodiments or features thereof may be made without departing from the principles and spirit of the disclosure, and such modifications shall fall within the scope of the disclosure.

What is claimed is:

1. A method for capturing a motion trajectory of a to-be-rendered virtual object, comprising:
   determining at least one tracking primitive corresponding to a to-be-rendered virtual object in a virtual scene based on the to-be-rendered virtual object, wherein the at least one tracking primitive covers a movable part of the to-be-rendered virtual object, and wherein the at least one tracking primitive does not cover a whole of the to-be-rendered virtual object;
   drawing the at least one tracking primitive in the virtual scene based on following a motion or an attitude of a respective mesh model corresponding to a respective movable part of the to-be-rendered virtual object;
   capturing a motion trajectory of the to-be-rendered virtual object in the virtual scene based on a motion of the at least one tracking primitive; and
   rendering the to-be-rendered virtual object in the virtual scene based on the motion trajectory.

2. The method according to claim 1, wherein the at least one tracking primitive comprises a first tracking primitive and a second tracking primitive, the first tracking primitive following a first mesh model associated with a first moving part of the to-be-rendered virtual object, and the second tracking primitive following a second mesh model associated with a second moving part of the to-be-rendered virtual object.

3. The method according to claim 1, wherein the drawing comprises:

classifying the at least one tracking primitive according to primitive types of the at least one tracking primitive, in order to obtain a tracking primitive set corresponding to each of the primitive types; and submitting, for the tracking primitive set, a draw call for drawing all tracking primitives in the tracking primitive set at a time.

4. The method according to claim 1, wherein the drawing comprises:

determining an attribute change of the at least one tracking primitive based on interaction data of each virtual object in the virtual scene and operation data of a controlled virtual object; and drawing the at least one tracking primitive based on the attribute change corresponding to the at least one tracking primitive.

5. The method according to claim 1, further comprising:

determining interaction data corresponding to the at least one tracking primitive based on the drawn tracking primitive; and determining motion trajectories corresponding to the at least one tracking primitive based on the interaction data.

6. The method according to claim 1, wherein the determining comprises:

acquiring a motion state of a to-be-rendered virtual object in the virtual scene;

determining at least one primitive identifier corresponding to the to-be-rendered virtual object based on the motion state of the to-be-rendered virtual object; and determining the at least one tracking primitive based on the at least one primitive identifier.

7. The method according to claim 6, wherein the determining the at least one tracking primitive based on the at least one primitive identifier comprises:

determining, based on the at least one primitive identifier, whether the at least one tracking primitive has been created;

updating a corresponding tracking primitive in a list of to-be-drawn primitives based on determining that the at least one tracking primitive has been created; and creating the corresponding tracking primitive and adding the corresponding tracking primitive to the list of to-be-drawn primitives in based on determining that the at least one tracking primitive has not been created.

8. The method according to claim 1, further comprising:

displaying the to-be-rendered virtual object on a display screen based on the motion trajectory of the to-be-rendered virtual object in the virtual scene.

9. An apparatus for capturing a motion trajectory of a to-be-rendered virtual object, the apparatus comprising:

at least one non-transitory memory configured to store instructions; and at least one processor configured to execute the instructions, wherein the instructions, when executed by the at least one processor, cause the at least one processor to:

determine at least one tracking primitive corresponding to a to-be-rendered virtual object in a virtual scene based on the to-be-rendered virtual object, wherein the at least one tracking primitive covers a movable part of the to-be-rendered virtual object, and wherein the at least one tracking primitive does not cover a whole of the to-be-rendered virtual object;

draw the at least one tracking primitive in the virtual scene based on following a motion or an attitude of a respective mesh model corresponding to a respective movable part of the to-be-rendered virtual object;

capture a motion trajectory of the to-be-rendered virtual object in the virtual scene based on a motion of the at least one tracking primitive; and render the to-be-rendered virtual object in the virtual scene based on the motion trajectory.

10. The apparatus according to claim 9, wherein the at least one tracking primitive comprises a first tracking primitive and a second tracking primitive, the first tracking primitive following a first mesh model associated with a first moving part of the to-be-rendered virtual object, and and the second tracking primitive following a second mesh model associated with a second moving part of the to-be-rendered virtual object.

11. The apparatus according to claim 9, wherein the drawing comprises:

classifying the at least one tracking primitive according to primitive types of the at least one tracking primitive, in order to obtain a tracking primitive set corresponding to each of the primitive types; and submitting, for the tracking primitive set, a draw call for drawing all tracking primitives in the tracking primitive set at a time.

12. The apparatus according to claim 9, wherein the drawing comprises:

determining an attribute change of the at least one tracking primitive based on interaction data of each virtual object in the virtual scene and operation data of a controlled virtual object; and drawing the at least one tracking primitive based on the attribute change corresponding to the at least one tracking primitive.

13. The apparatus according to claim 9, wherein the instructions when executed by the at least one processor, further cause the at least one processor to:

determine interaction data corresponding to the at least one tracking primitive based on the at least one tracking primitive; and determine motion trajectories corresponding to the at least one tracking primitive based on the interaction data.

14. The apparatus according to claim 9, wherein the determining comprises:

acquiring a motion state of a to-be-rendered virtual object in the virtual scene;

determining at least one primitive identifier corresponding to the to-be-rendered virtual object based on the motion state of the to-be-rendered virtual object; and determining the at least one tracking primitive based on the at least one primitive identifier.

15. The apparatus according to claim 14, wherein the determining the at least one tracking primitive based on the at least one primitive identifier comprises:

determining, based on the at least one primitive identifier, whether the at least one tracking primitive has been created;

updating a corresponding tracking primitive in a list of to-be-drawn primitives based on determining that the at least one tracking primitive has been created; and creating the corresponding tracking primitive and adding the corresponding tracking primitive to the list of to-be-drawn primitives in based on determining that the at least one tracking primitive has not been created.

16. The apparatus according to claim 9, wherein the instructions when executed by the at least one processor, further cause the at least one processor to:

displaying the to-be-rendered virtual object on a display screen based on the motion trajectory of the to-be-rendered virtual object in the virtual scene.

17. A non-transitory computer-readable medium containing program code which, when executed by at least one processor of a device for capturing a motion trajectory of a to-be-rendered virtual object, causes the at least one processor to:

determine at least one tracking primitive corresponding to a to-be-rendered virtual object in a virtual scene based on the to-be-rendered virtual object, wherein the at least one tracking primitive covers a movable part of the to-be-rendered virtual object, and wherein the at least one tracking primitive does not cover a whole of the to-be-rendered virtual object;

draw the at least one tracking primitive in the virtual scene based on following a motion or an attitude of a respective mesh model corresponding to a respective movable part of the to-be-rendered virtual object;

capture a motion trajectory of the to-be-rendered virtual object in the virtual scene based on a motion of the at least one tracking primitive; and render the to-be-rendered virtual object in the virtual scene based on the motion trajectory.

18. The non-transitory computer-readable medium according to claim 17, wherein the at least one tracking primitive comprises a first tracking primitive and a second tracking primitive, the first tracking primitive following a first mesh model associated with a first moving part of the to-be-rendered virtual object, and the second tracking primitive following a second mesh model associated with a second moving part of the to-be-rendered virtual object.

19. The non-transitory computer-readable medium of claim 17, wherein to draw the at least one tracking primitive, the program code is further configured to cause the at least one processor to:

classify the at least one tracking primitive according to primitive types of the at least one tracking primitive, in order to obtain a tracking primitive set corresponding to each of the primitive types; and submit, for the tracking primitive set, a draw call for drawing all tracking primitives in the tracking primitive set at a time.

20. The non-transitory computer-readable medium of claim 17, wherein to draw the at least one tracking primitive, the program code is further configured to cause the at least one processor to:

determine an attribute change of the at least one tracking primitive based on interaction data of each virtual object in the virtual scene and operation data of a controlled virtual object; and draw the at least one tracking primitive based on the attribute change corresponding to the at least one tracking primitive.

\*    \*    \*    \*    \*